(12) United States Patent
Szumski et al.

(10) Patent No.: US 10,769,515 B2
(45) Date of Patent: Sep. 8, 2020

(54) COMPOSITE LAMINATE ASSEMBLY USED TO FORM PLURAL INDIVIDUAL CARDS AND METHOD OF MANUFACTURING THE SAME

(71) Applicant: Illinois Tool Works Inc., Glenview, IL (US)

(72) Inventors: Daniel Szumski, Saint John, IN (US); Suwit John Sangkaratana, Crown Point, IN (US); Roger D. Strasemeier, Sauk Village, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/890,766

(22) Filed: Feb. 7, 2018

(65) Prior Publication Data

US 2018/0232616 A1 Aug. 16, 2018

Related U.S. Application Data

(60) Provisional application No. 62/459,827, filed on Feb. 16, 2017.

(51) Int. Cl.
*B63B 3/02* (2006.01)
*G06K 19/077* (2006.01)
(Continued)

(52) U.S. Cl.
CPC .......... *G06K 19/07722* (2013.01); *B32B 7/12* (2013.01); *B32B 15/08* (2013.01);
(Continued)

(58) Field of Classification Search
CPC ......... B32B 27/06; B32B 27/08; B32B 27/30; B32B 27/36; B32B 27/304; B32B 27/365;
(Continued)

(56) References Cited

U.S. PATENT DOCUMENTS 4,101,698 A 7/1978 Dunning et al.
4,407,871 A 10/1983 Eisfeller
(Continued)

FOREIGN PATENT DOCUMENTS

EP 2015232 A1 1/2009
RU 2079166 C1 5/1997
(Continued)

OTHER PUBLICATIONS

International Search Report and Written Opinion for corresponding International application No. PCT/US2018/017380; From the International Searching Authority, dated May 4, 2018, 15 pages.
(Continued)

*Primary Examiner* — Elizabeth E Mulvaney
(74) *Attorney, Agent, or Firm* — Christopher R. Carroll; The Small Patent Law Group LLC

(57) ABSTRACT

A laminated core stock sheet for use in a composite laminate assembly that is separated into individual cards is provided. The sheet includes a core substrate layer and an intermediate filmic layer coupled to the core substrate layer. The intermediate filmic layer includes a conductive material that provides a security, decorative, or functional feature of the cards. The core substrate layer and the intermediate filmic layer are coupled with another laminated core stock sheet to form the composite laminate assembly. The conductive material has a small thickness within the intermediate filmic layer such that the intermediate filmic layer prevents conduction of electrostatic discharge (ESD) through the intermediate filmic layer and outside of the individual cards.

20 Claims, 4 Drawing Sheets

(51) Int. Cl.
  *B32B 27/06* (2006.01)
  *B32B 27/08* (2006.01)
  *B32B 27/30* (2006.01)
  *B32B 27/36* (2006.01)
  *B32B 15/09* (2006.01)
  *B32B 15/082* (2006.01)
  *B32B 7/12* (2006.01)
  *B32B 15/08* (2006.01)
  *B32B 37/20* (2006.01)
  *B32B 38/00* (2006.01)

(52) U.S. Cl.
  CPC ............ *B32B 15/082* (2013.01); *B32B 15/09* (2013.01); *B32B 27/06* (2013.01); *B32B 27/08* (2013.01); *B32B 27/30* (2013.01); *B32B 27/304* (2013.01); *B32B 27/36* (2013.01); *B32B 27/365* (2013.01); *B32B 37/203* (2013.01); *B32B 38/0004* (2013.01); *B32B 38/145* (2013.01); *B32B 2255/10* (2013.01); *B32B 2255/205* (2013.01); *B32B 2307/202* (2013.01); *B32B 2307/208* (2013.01); *B32B 2307/416* (2013.01); *B32B 2307/732* (2013.01); *B32B 2425/00* (2013.01); *B32B 2519/02* (2013.01)

(58) Field of Classification Search
  CPC .... B42D 25/47; B42D 25/369; B42D 25/373; G06K 19/16; G06K 19/07735
  See application file for complete search history.

(56) References Cited

U.S. PATENT DOCUMENTS

| | | | |
|---|---|---|---|
| 5,260,941 | A | 11/1993 | Wilder et al. |
| 7,677,462 | B2 | 3/2010 | Hynes et al. |
| 7,931,207 | B2 | 4/2011 | Holmes et al. |
| 2007/0211398 | A1 | 9/2007 | Whitney |
| 2008/0245865 | A1 | 10/2008 | Mosteller |
| 2010/0116891 | A1* | 5/2010 | Yano .................. G11B 5/00808 235/488 |
| 2015/0041546 | A1* | 2/2015 | Herslow ................ G06K 19/02 235/492 |
| 2015/0125670 | A1 | 5/2015 | Szumski et al. |
| 2015/0180229 | A1 | 6/2015 | Herslow |

FOREIGN PATENT DOCUMENTS

| | | |
|---|---|---|
| WO | 20070062170 A1 | 5/2007 |
| WO | 20070097775 A1 | 8/2007 |

OTHER PUBLICATIONS

International Preliminary Report on Patentability and Written Opinion issued for PCT Application No. PCT/US2018/017380 dated Aug. 20, 2019 (9 pages).
Official Action issued by the Patent Office of the Russian Federation dated Apr. 14, 2020 for corresponding Russian patent application No. 2019128563 (7 pages).
English translated version of the Official Action issued by the Patent Office of the Russian Federation dated Apr. 14, 2020 for corresponding Russian patent application No. 2019128563 (7 pages).
Search Report issued by the Patent Office of the Russian Federation dated Apr. 14, 2020 for corresponding Russian patent application No. 2019128563 (2 pages).
English translated version of the Search Report issued by the Patent Office of the Russian Federation dated Apr. 14, 2020 for corresponding Russian patent application No. 2019128563 (2 pages).
First Examination Report dated Jul. 11, 2020 for corresponding IN Patent Application No. 201917030821 (7 pages).

* cited by examiner

COMPOSITE LAMINATE ASSEMBLY USED TO FORM PLURAL INDIVIDUAL CARDS AND METHOD OF MANUFACTURING THE SAME

CROSS-REFERENCE TO RELATED APPLICATIONS

This application claims priority to U.S. Provisional Application No. 62/459,827, which was filed 16 Feb. 2017, and the entire disclosure of which is incorporated herein by reference.

BACKGROUND

The present disclosure relates to laminated sheets and cards that are manufactured from these sheets. Laminated sheets and cards are used in a variety of applications, such as financial transaction cards (e.g., credit or debit cards, phone cards, gift cards, loyalty cards, etc.), security cards (e.g., identification cards), and the like. Some known sheets and cards may be formed from multiple layers of plastic based substrates, holographic, metallized, printed or clear films or foils, adhesives and coatings, among other layers. The cards also may include printing, graphics, and/or other features.

The cards and the sheets from which the cards are formed can include a metallized layer to form various decorative, security, or other functional features of the cards. Such a layer can be used to provide a holographic effect or feature, or another decorative feature, which can be used to distinguish between legitimate and counterfeit cards, or the like.

Electrostatic energy can pass through these metallized layers of the cards. For example, through routine or daily use of a financial transaction card by a user, electrostatic energy can pass through a metallized layer in the card that extends along the length of the card, from one end to an opposite end along the card. When the card is inserted into an electronic machine or device (e.g., a point of sale terminal), one or more portions of the metallized layer may contact the machine or device and conduct the electrostatic energy into the machine or device. Conducting this energy can be referred to as electrostatic discharge, or ESD. The ESD can damage the machine or device and prevent the machine or device from being used.

BRIEF DESCRIPTION

In one embodiment, a laminated core stock sheet for use in a composite laminate assembly configured for being separated into plural individual cards is provided. The laminated core stock sheet includes a core substrate layer and an intermediate filmic layer coupled to the core substrate layer. The intermediate filmic layer includes a conductive material that provides at least one of a security feature, a decorative feature, or other functional feature of the individual cards. The core substrate layer and the intermediate filmic layer are configured to be coupled with another laminated core stock sheet that may or may not include the intermediate filmic layer to form the composite laminate assembly configured for being separated into the individual cards. The conductive material has a small thickness within the intermediate filmic layer such that the intermediate filmic layer prevents conduction of electrostatic discharge (ESD) through the intermediate filmic layer and outside of the individual cards.

In one embodiment, a composite laminate assembly configured to be separated into plural individual cards is provided. The assembly includes a first laminated core stock sheet including a first core substrate layer and a first intermediate filmic layer coupled to the first core substrate layer. The first intermediate filmic layer includes a conductive material that provides at least one of a security feature, a decorative feature, or other functional feature of the individual cards. The assembly also includes a second laminated core stock sheet including at least a second core substrate layer, wherein the first laminated core stock sheet and the second laminated core stock sheet are configured to be laminated together, a first overlay layer configured to be coupled with the first laminated core stock sheet, and a second overlay layer configured to be coupled with the second laminated core stock sheet such that the first and second laminated core stock sheets are disposed between the first overlay layer and the second overlay layer. The conductive material of the first intermediate filmic layer has a sufficiently small thickness to prevent conduction of electrostatic discharge (ESD) through the first intermediate filmic layer and outside of the individual cards.

In one embodiment, a method includes depositing a conductive material onto a continuous filmic web, and coupling the filmic web with the conductive material to a core substrate layer to form a first laminated core stock sheet. The first laminated core stock sheet is configured to be coupled with a second laminated core stock sheet that may or may not include the intermediate filmic layer to form a composite laminate assembly configured for being separated into individual cards. The conductive material is deposited at a thickness that prevents conduction of electrostatic discharge (ESD) through the first intermediate filmic layer and outside of the individual cards through the filmic web.

In one embodiment, a card assembly includes plural laminated core stock sheets coupled with each other, where at least one of the laminated core stock sheets includes a core substrate layer and an intermediate filmic layer coupled to the core substrate layer. The intermediate filmic layer includes a conductive material that provides at least one of a security feature, a decorative feature, or other functional feature. The conductive material has a small thickness within the intermediate filmic layer such that the intermediate filmic layer prevents lateral conduction of electrostatic discharge (ESD) through the intermediate filmic layer and outside of the individual cards.

BRIEF DESCRIPTION OF THE DRAWINGS

The present inventive subject matter will be better understood from reading the following description of non-limiting embodiments, with reference to the attached drawings (which are not necessarily drawn to scale), wherein below.

DETAILED DESCRIPTION

Figure 1:
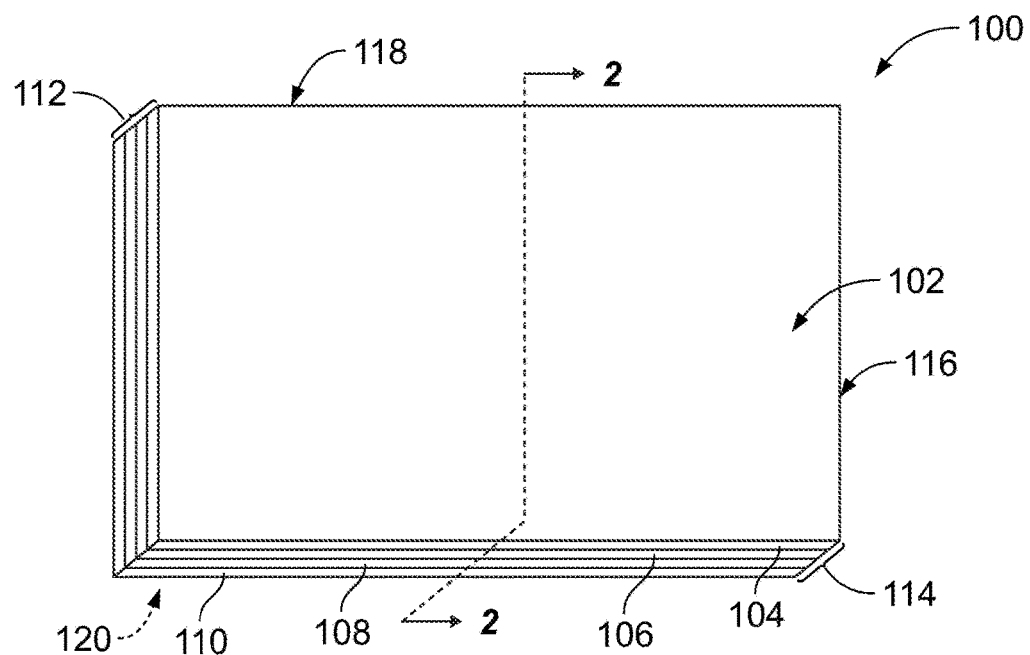
FIG. 1 is a schematic diagram of a laminated card formed in accordance with one or more embodiments of the inventive subject matter described herein.
Figure 2:
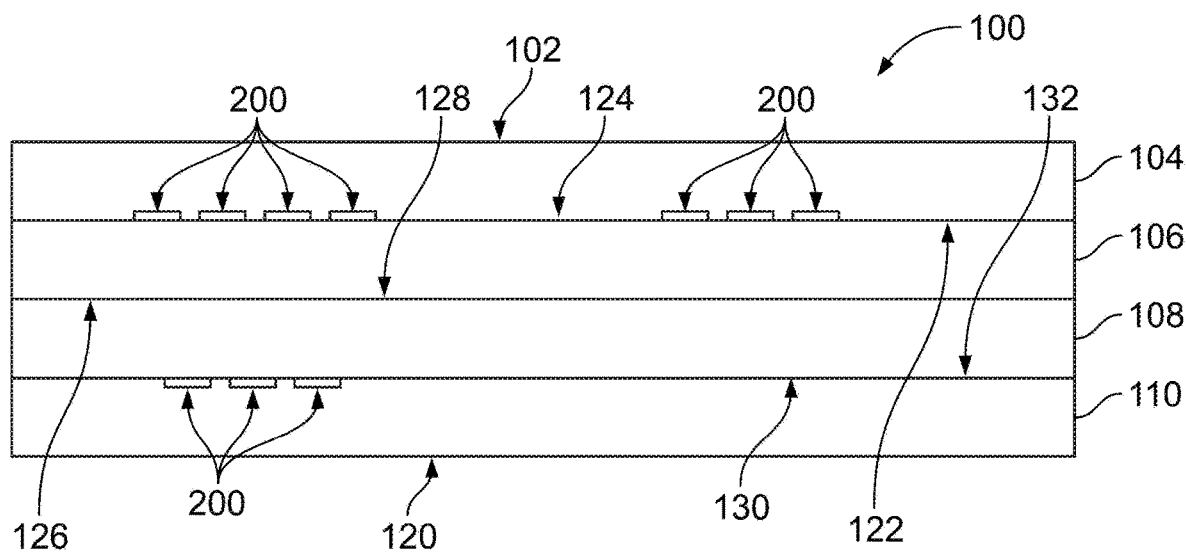
FIG. 2 is a cross-sectional view of the card along line 2-2 in FIG. 1.

FIG. 1 is a schematic diagram of a laminated card 100 formed in accordance with one or more embodiments of the inventive subject matter described herein. FIG. 2 is a cross-sectional view of the card 100 along line 2-2 shown in FIG. 1. The card 100 may be used in a variety of applications, such as a financial transaction card (e.g., credit or debit card, phone card, gift card, loyalty card, etc.), a security card (e.g., identification card), and the like. The card 100 includes a visible surface or side 124 on which information may be printed or otherwise shown. For example, the surface or side 124 may include text, numbers, images, and the like, that indicate a use of the card 100, an owner of the card 100, an institution that issued and/or accepts the card 100, or the like. The card 100 is formed from several planar sections of sheets that are laminated together. These planar sheet sections include overlay layers 104, 110 and core stock layers 106, 108. The core stock layers 106, 108 are coupled with each other and form the core or center of the card 100.

The overlay layers 104, 110 are coupled to the core stock layers 106, 108 and form the exterior sides of the card 100. The overlay layer 104 extends between the visible surface or side 102 and an opposite interface side 122. The core stock layer 106 extends between an interface side 124 to an opposite interface side 126. In the illustrated embodiment, the interface side 122 of the overlay layer 104 engages (e.g., abuts) the interface side 124 of the core stock layer 106. The core stock layer 108 extends from an interface side 128 to an opposite interface side 130. The interface side 126 of the core stock layer 106 can abut the interface side 128 of the core stock layer 108. The overlay layer 110 extends from the exterior surface or side 120 to an opposite interface side 130. The interface side 130 of the core stock layer 108 may abut the interface side 132 of the overlay layer 110.

Information such as text, images, and the like, can be printed on the outer surfaces of the core stock layers 106, 108 as printed material 200. For example, information can be printed on the side 124 of the core stock layer 106 and/or the side 130 of the core stock layer 108, such as an account number, name of the account holder, phone numbers, identifying information, and the like. The overlay layers 104, 110 may be placed onto the corresponding sides 124, 130 of the core stock layers 106, 108 to protect the information printed on the core stock layers 106, 108. The overlay layers 104, 110 may be formed from a nonconductive material, such as polyvinyl chloride (PVC), polyethylene terephthalate (PET), polycarbonate (PC), copolymerized PET (PETG), or the like. The overlay layers 104, 110 may vary in thickness and, in one embodiment, are at least two mils (e.g., 0.05 millimeters) thick. Alternatively, the overlay layers 104, 110 may be a smaller or larger thickness.

As described below, one or more of the core stock layers 106, 108 can include a filmic layer 302 (shown in FIG. 3) formed from a conductive material. In one embodiment, only one of the core stock layers 106, 108 includes the filmic layer 302. Alternatively, both core stock layers 106, 108 may include the filmic layer 302. The filmic layer 302 can be used as a reflective and/or refractive layer of the card 100 that assists in decorating the card, verifying authenticity of the card, or the like. As described below, the conductive material in the filmic layer(s) 302 can be sufficiently thin so that a conductive pathway between two or more edges of the card 100 does not exist. For example, even though the conductive material of the filmic layer 302 may extend across all or predominantly all of a planar surface of the core stock layer 106 and/or the core stock layer 108, the conductive material may not form a conductive pathway that extends from one edge 112, 114, 116, 118 of the card 100 to another edge 112, 114, 116, 118 of the card 100. The edges 112, 114, 116, 118 extend from one side or surface 102 of the card 100 to the opposite side or surface 120 of the card 100. The lack of such a conductive pathway allows for the card 100 to include a reflective layer for decorating the card, verifying the authenticity of the card, or the like, while avoiding discharge of ESD from the card 100.

Figure 3:
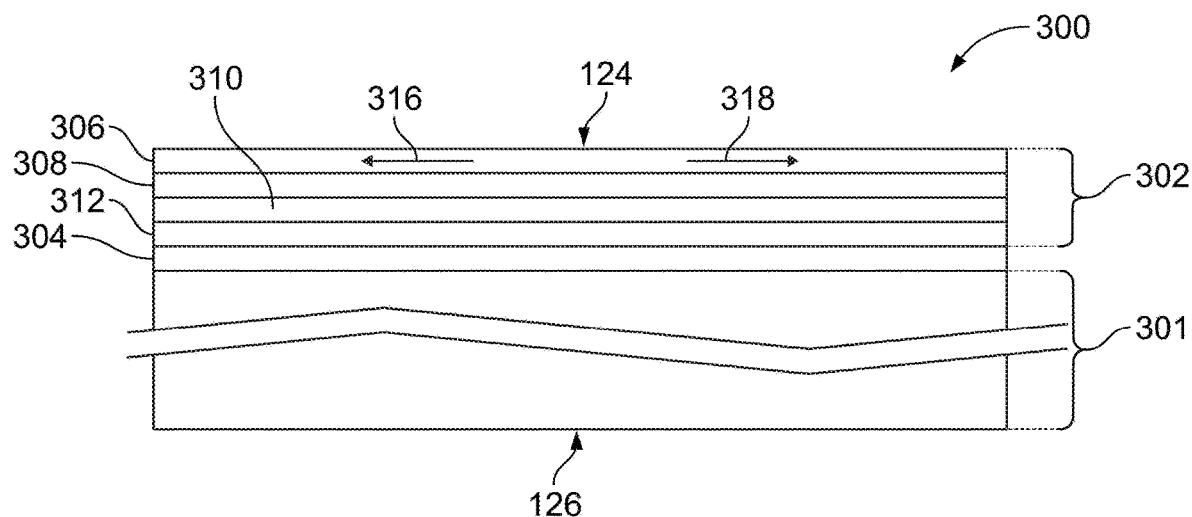
FIG. 3 is a cross-sectional view of a laminate core stock layer shown in FIG. 1 according to one embodiment of the inventive subject matter described herein.

FIG. 3 is a cross-sectional view of a core stock layer 300 shown in FIG. 1 according to one embodiment of the inventive subject matter described herein. The core stock layer 300 may represent either or both core stock layers 106, 108 shown in FIGS. 1 and 2. The core stock layer 300 includes several layers (e.g., films) laminated together. These layers include a core substrate layer 301 that may include or be formed from one or more dielectric films, such as PET, PVC, PC, PETG, acrylic, Teslin™, or the like. The core substrate layer 301 is coupled to a conductive filmic layer 302 by an adhesive layer 304. The core substrate layer 301 is shown as being substantially thicker than the other layers in the core stock layer, but alternatively may have a different thickness. The adhesive layer 304 is formed from one or more materials that couple the core substrate layer 301 to the filmic layer 302 to prevent the filmic layer 302 from being separated from the core substrate layer 301.

The filmic layer 302 includes a supporting film or layer 306 having an emboss coating layer 308 with conductive material 310 disposed thereon. A tie coat layer 312 is coupled with the conductive material 310 and the adhesive layer 304 that binds the filmic layer 302 to the core substrate layer 300. The tie coat layer 312 binds the adhesive layer 304 to the conductive material 310. The conductive material 310 continuously extends across the entire footprint or lateral area of the core stock layer 300 without having any visible separation gaps between separate bodies of the conductive material 310. For example, the conductive material 310 may not be formed from bodies that are laterally spaced apart from each other in lateral directions 316, 318 that are oriented parallel to a plane defined by the side 126 or the side 124. The conductive material 310 may continuously extend, without visible breaks or gaps, from one edge 112 (shown in FIG. 1) of the card 100 that includes the core stock layer 300 to the opposite edge 116 (shown in FIG. 1) of the card 100. For example, the conductive material 310 may not have any breaks in one embodiment, or optionally may have one or more separations between conductive bodies. The separations between the conductive bodies may be so small as to not be visible without magnification, which can be referred to as optically continuous. Optionally, the conductive material 310 may not include a regular arrangement or array of conductive bodies that is repeated two or more times. Additionally or alternatively, the conductive material 310 may continuously extend, without visible breaks or gaps, from the edge 114 (shown in FIG. 1) of the card 100 to the opposite edge 118 (shown in FIG. 1) of the card 100.

The conductive material 310 of the filmic layer 302 can be reflective to provide a security feature, a functional feature, a decorative feature, and/or another feature for the card 100. For example, the conductive material 310 can provide a reflective layer used in a mirror or holographic layer of the card 100 that assists in decorating the card, verifying authenticity of the card, or the like. In one aspect, the conductive material 310 are formed from a metal or metal alloy, such as aluminum. Optionally, another type of metal or metal alloy, or one or more additional metals or metal alloys may be used to form the conductive material 310. For example, one or more of zinc, gallium, cadmium, copper, indium, nickel, cobalt, iron, magnesium, platinum, chromium, tin, silver, rhodium, and/or palladium may be used. The conductive material 310 may be deposited in a sufficiently thin layer to prevent conduction of ESD through the conductive material 310. For example, conductive material 310 may be very thin and have a thickness dimension that is sufficiently small to block or prevent conduction of electric current between different edges of the card through the conductive material 310. For example, the thickness of the conductive material 310 can be measured as less than 1,500 angstroms in directions that are perpendicular to the front and rear surfaces 102, 120 of the card assembly 100. Alternatively, the conductive material 310 may have a smaller thickness dimension. In one embodiment, the optical density of the conductive material 310 is at least 0.25 but no greater than 4.0. These thicknesses and/or optical densities have been found by the inventors of the subject matter described herein to prevent the conduction of ESD through the conductive material 310, even though the conductive material 310 may be formed as a continuous sheet extending over all of the footprint of the card that includes the conductive material 310.

The supporting layer 306 supports the emboss coating layer 308 and the conductive material 310 when the conductive material 310 is formed or deposited on the emboss coating layer 308, as described below. The supporting layer 306 also may be referred to as a carrier or printable layer. Images, text, and the like, representative of the card, the owner of the card, a financial institution, or the like, can be printed onto this layer 306. In one aspect, the layer 306 includes or is formed from PET, but optionally may include or be formed from PVC, PC, PETG, acrylic, or another type of material. The layer 308 may be an embossable layer capable of being deformed by one or more male and/or female roller dies to create a raised (or lowered) design (or relief).

The emboss coating layer 308 can include a non-conductive coating disposed on the supporting film 306 allows indicia (e.g., an image, text, or the like) to be embossed into or out of the card 100 that includes the core stock layer 300. The emboss coating layer 308 can resist melting or flowing when exposed to relatively high temperatures. Additionally or alternatively, the emboss coating layer 308 may operate as an adhesive to bond the supporting layer 306 to the conductive material 310.

Figure 4:
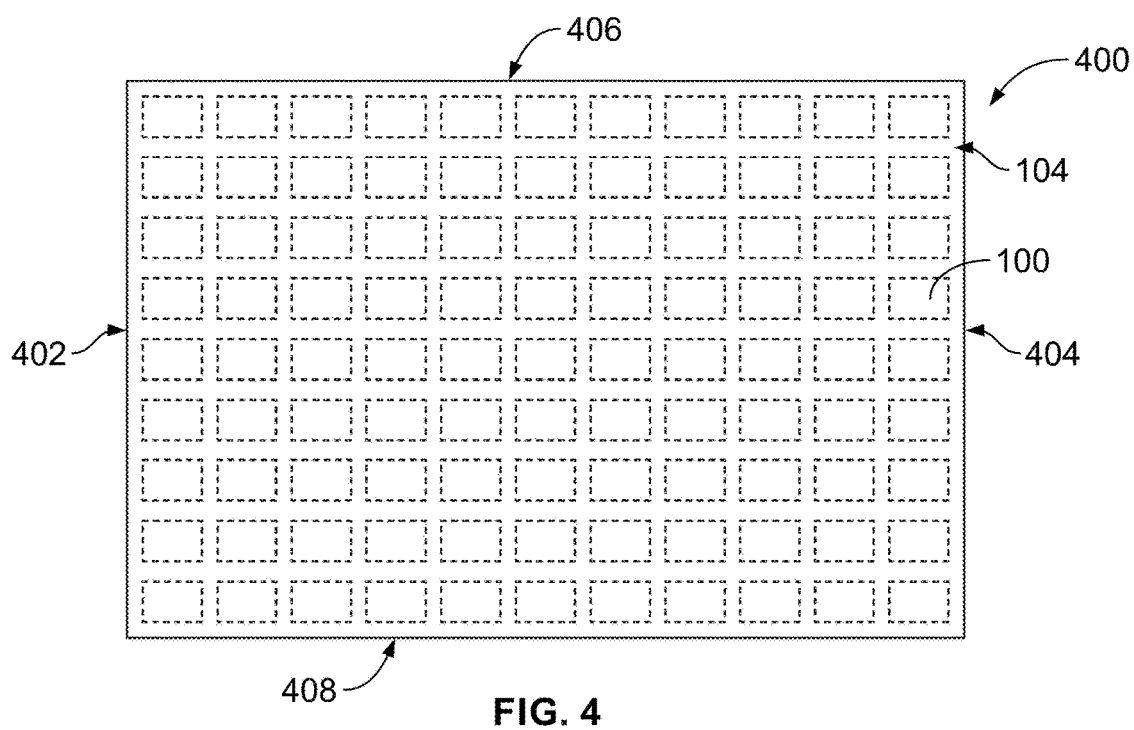
FIG. 4 is a top view of a composite laminate assembly from which several cards may be formed in accordance with one embodiment.

FIG. 4 is a top view of a composite laminate assembly 400 from which several cards 100 may be formed in accordance with one embodiment. The laminate assembly 400 laterally extends between opposite edges 402, 404 along one direction and laterally extends between opposite edges 406, 408 along a perpendicular direction. The laminate assembly 400 may have a similar cross-section as the cross-section of the card 100 shown in FIG. 2. For example, the laminate assembly 400 may have a lower print or overlay layer 110 (shown in FIG. 2 but not visible in FIG. 4) coupled to core stock layers 106, 108 (shown in FIG. 2 but not visible in FIG. 4), which are coupled to an upper print or overlay layer 104. The sections of the layers 104, 106, 108, 110 that are included in the card 100 shown in FIG. 2 may be smaller (e.g., not as wide) than the layers 104, 106, 108, 110. For example, the layers 104, 106, 108, 110 shown in FIG. 2 may be subsets or segments of the layers 104, 106, 108, 110 in the laminate assembly 400. Several individual cards 100 may be cut from the laminate assembly 400. For example, the cards 100 may be cut through an entire thickness of the laminate assembly 400. The number and/or arrangement of the cards 100 shown in FIG. 4 are provided merely as one non-limiting example.

Returning to the description of the card 100 shown in FIG. 2, the filmic layer 302 (shown in FIG. 3) may be buried in the card 100 and/or in the assembly 300 (shown in FIG. 3) from which cards are cut or otherwise formed. By "buried," it is meant that the filmic layer 302 is disposed sufficiently far into the bulk of the body of the card 100 from the exposed surface or side 102, 120 that is closest to the filmic layer 302 that the filmic layer 302 is not at or relatively close to this exposed surface or side 102, 120. The filmic layer 302 may not be visible along the exposed surface or sides 102, 120 of the card 100. For example, the filmic layer 302 may be more than two mils (e.g., 0.05 millimeters) from the exterior surface or side 102, 120 that is closest to the filmic layer 302. Alternatively, portions of the filmic layer 302 may be visible along one or more of the edges 112, 114, 116, 118 (shown in FIG. 1) of the card 100 and/or one or more of the edges 402, 404, 406, 408 (shown in FIG. 4) of the laminate assembly 400 (shown in FIG. 4).

In one aspect, the filmic layer 302 may be buried far enough into the card 100 such that, even if information were to be magnetically stored in the layer 302, this information could not be magnetically read from the filmic layer 302. For example, while some cards may have magnetic stripes at or near an exposed surface 102, 120 of the cards and these strips are used to obtain information from the cards, the filmic layer 302 may be sufficiently far into the card 100 that the filmic layer 302 cannot have information magnetically stored therein that can be magnetically read from the external surface 102, 120 of the card. As described below, however, in one embodiment, the card may include a radio frequency identification (RFID) device that may transmit and/or receive electromagnetic waves through the filmic layer 302 to communicate with an RFID device that is located outside of the card. Additionally or alternatively, the filmic layer 302 may not store any information. For example, in contrast to a magnetic stripe of a transaction card, the filmic layer 302 may not magnetically (or otherwise) store any information about the card owner, the card, an account, or the like.

Figure 5:
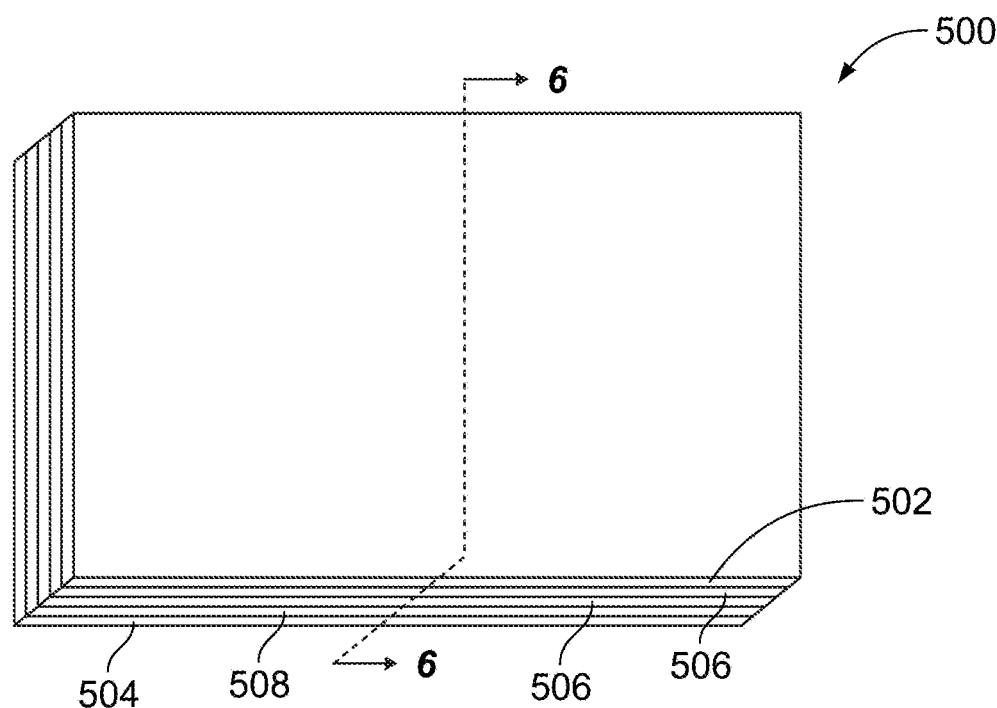
FIG. 5 is a schematic diagram of a laminated card having an RFID inlay and formed in accordance with another embodiment.
Figure 6:
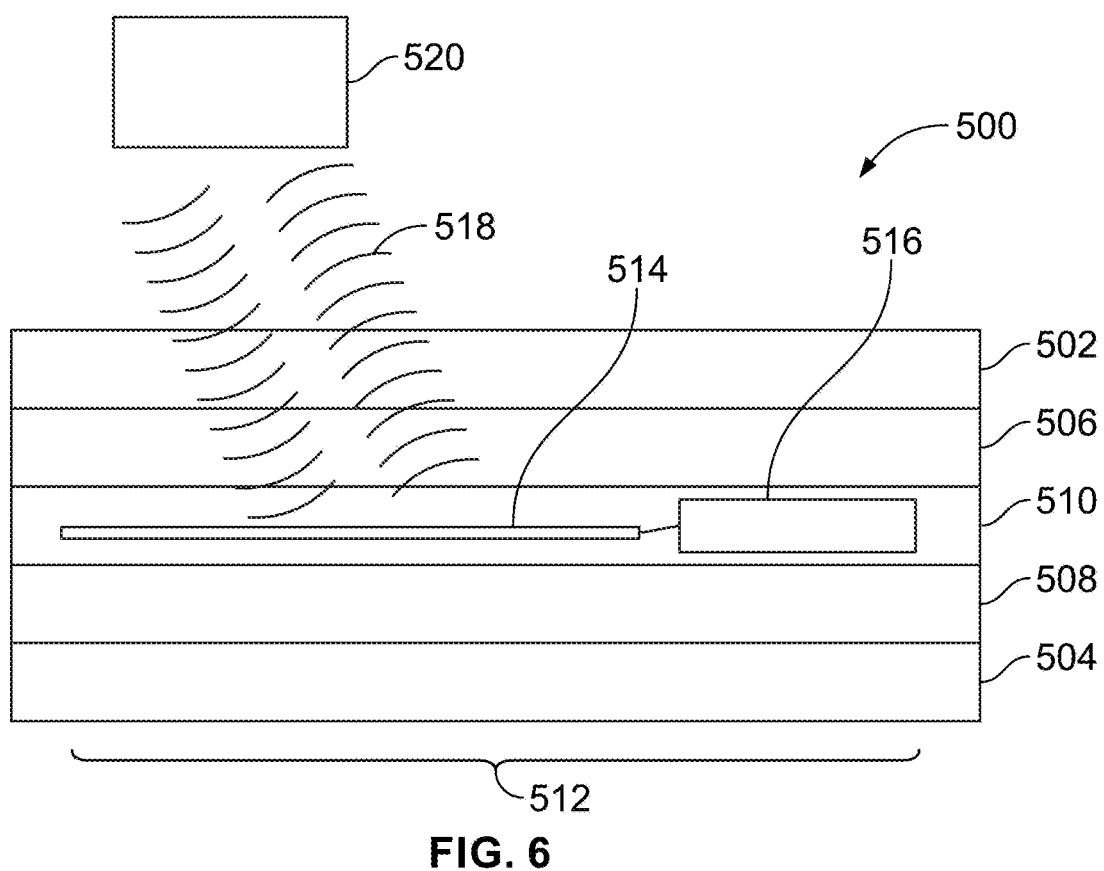
FIG. 6 is a cross-sectional view of the card along line 5-5 shown in FIG. 5.

FIG. 5 is a schematic diagram of a laminated card 500 formed in accordance with another embodiment. FIG. 6 is a cross-sectional view of the card 500 along line 5-5 shown in FIG. 5. Similar to the card 100 shown in FIG. 1, the card 500 may be used in a variety of applications, such as a financial transaction card (e.g., credit or debit card, phone card, gift card, loyalty card, etc.), a security card (e.g., identification card), and the like. The card 500 is formed from several planar sections of sheets that are laminated together. These planar sheet sections can include overlay layers 502, 504 that may be similar or identical to the overlay layers 104, 110 shown in FIG. 1 and core stock layers 506, 508 that may be similar or identical to the core stock layers 106, 108 shown in FIG. 1. Each of the core stock layer 506, 508 is coupled to a different overlay layer 502, 504. As described above, the overlay layers 502, 504 form the exterior sides of the card 500. Also as described above, one or more of the core stock layers 506, 508 can include a filmic layer such as the filmic layer 302 (shown in FIG. 3) having a conductive material, which can be used as a reflective and/or conductive layer used in a holographic layer of the card 500 that assists in decorating the card, verifying authenticity of the card, or the like.

One difference between the card 100 shown in FIG. 1 and the card 500 shown in FIGS. 5 and 6 is the inclusion of a RFID inlay layer 510 in the card 500. In the illustrated embodiment, the RFID inlay layer 510 is disposed between the core stock layers 506, 508. For example, the RFID inlay layer 510 may be sandwiched between and coupled to the core stock layers 506, 508. The RFID inlay layer 510 may include or be formed from one or more non-conductive materials, such as PVC, PC, PET, PETG, and the like.

Disposed within the RFID inlay layer 510 of the card 500 is an RFID device 512. The RFID device 512 includes an RFID antenna 514 and an RFID tag 516 that are used for wirelessly communicating with one or more external devices 520. For example, the RFID device 512 may be interrogated by and communicate with an external RFID reader 520 that generates an electromagnetic field and/or electromagnetic waves. These electromagnetic fields and/or waves are received by the RFID antenna 514 to power the RFID tag 516. Optionally, the RFID device 512 may be powered by a separate power source. The RFID tag 516 can cause the RFID antenna 514 to wirelessly transmit electromagnetic waves 518 back to the RFID reader 520. In the illustrated example, the RFID antenna 514 may transmit the waves 518 through the core stock layer 506 and/or 508. If one or more of the core stock layers 506, 508 includes the filmic layer 302 having the conductive material 310 extending over substantially all of the filmic layer 302 (as described herein), the electromagnetic waves communicated to the RFID antenna 514 and/or the electromagnetic waves communicated from the RFID antenna 514 may pass through the filmic layer. The RFID device 512 can be used to conduct a transaction with the card 500, provide identification information about the owner of the card 500, authenticate the legitimacy of the card 500, and the like.

For example, the conductive material 310 (shown in FIG. 3) in the filmic layer 302 that is between the RFID antenna 514 in the card 500 and the RFID reader 520 may be sufficiently thin so that the electromagnetic waves 518 are able to pass through the filmic layer 302. For example, the low optical density of the conductive material 310 can permit a relatively large range of frequencies of electromagnetic waves to pass through the filmic layer 302 from the RFID reader 520 to the antenna 514, from the antenna 514 to the RFID reader 520, or both from the RFID reader 520 to the antenna 514 and from the antenna 514 to the RFID reader 520.

The thin conductive material 310 in the filmic layer 302 can permit for relatively low frequency electromagnetic waves 518 to pass through the filmic layer 302 (and be received by the antenna 514 or the external RFID device 520, depending on which is generating the waves). For example, the RFID device 512 may be able to communicate (e.g., transmit, receive, or both transmit and receive) electromagnetic waves 518 having sub-gigahertz frequencies or less. In one embodiment, the RFID device 512 may be able to communicate electromagnetic waves 518 having frequencies of 20 megahertz or less. Optionally, the RFID device 512 may be able to communicate electromagnetic waves 518 having other frequencies through the filmic layer 302. As a result, the card 500 may include a reflective or mirrored surface of the filmic layer 302 for security, decorative, or other functional features, while also permitting an RFID device 512 in the card 500 to communicate through the filmic layer 302 with one or more external devices (e.g., the reader 520).

Figure 7:
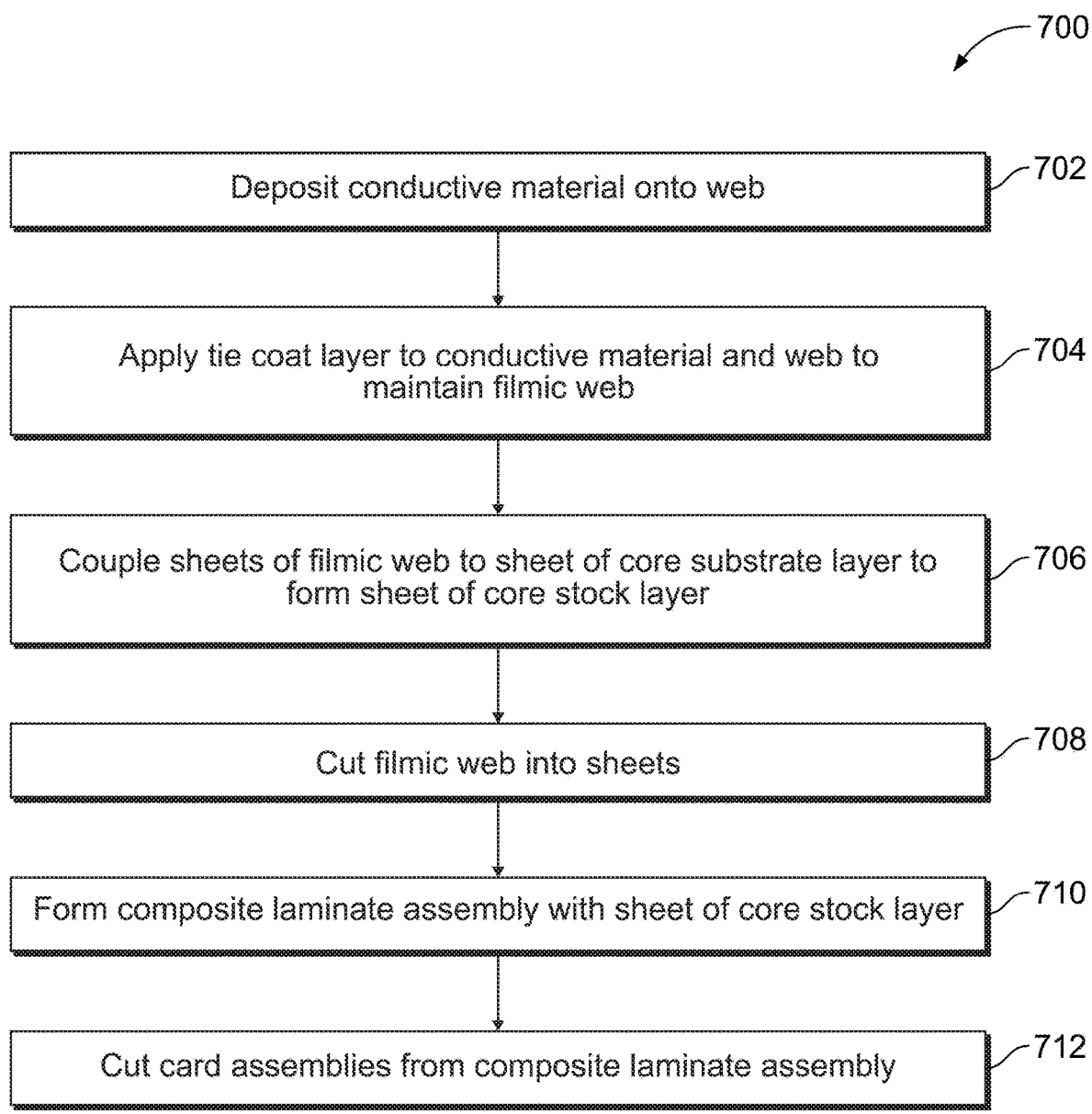
FIG. 7 illustrates a flowchart of a method for manufacturing cards in accordance with one embodiment.

FIG. 7 illustrates a flowchart of a method 700 for manufacturing cards in accordance with one embodiment. The method 700 may be used to create one or more of the cards described herein, to create one or more of the composite laminate assemblies described herein, or to create both the cards and the composite laminate assemblies.

At 702, conductive material is deposited onto a web. The web may include or be formed from the supporting film 306 (shown in FIG. 3), or the supporting film 306 and the emboss coating layer 308 (shown in FIG. 3).

At 704, a tie coat layer is applied to the conductive material and the web to maintain the filmic web. For example, formation of the filmic layer can be completed by applying the tie coat layer while the filmic layer is still in the form of a continuous web. Optionally, the filmic layer may be maintained without the tie coat layer. The tie coat layer can be applied to the web so that the tie coat layer extends over all or substantially all of the conductive material and the portions of the web that do not have conductive material deposited thereon.

At 706, the filmic web can be coupled to one or more sheets of a core substrate layer to form one or more sheets of a core stock layer. For example, the adhesive layer 304 (shown in FIG. 3) may be applied to the tie coat layer 312 (shown in FIG. 3) and the core substrate layer 300 (shown in FIG. 3) may be coupled thereto to form the core stock layer, as described above.

At 708, the laminated filmic web is cut into one or more smaller sheets. For example, the filmic web may be cut into sheets that are larger than the portions of the filmic web that eventually are included in the individual cards, but that also are smaller than the continuous web on which the conductive bodies were deposited.

At 710, a composite laminate assembly is formed from one or more of the sheets of the core stock layer. For example, a sheet of the core stock layer having the filmic layer can be coupled with another core stock layer having another filmic layer, a core stock layer that does not include the filmic layer, an RFID inlay, an overlay layer, or a combination of two or more of these layers. The combination of these layers can form one or more of the composite laminate assemblies described herein.

At 712, one or more cards (e.g., cards 100, 700, 900) are cut from the composite laminate assembly. In an embodiment where the cards are to include RFID devices, the composite laminate assembly may include several RFID devices spaced apart from each other so that the cards may be cut from the composite laminate assembly such that each card includes at least one RFID device.

In one embodiment, a laminated core stock sheet for use in a composite laminate assembly configured for being separated into plural individual cards is provided. The laminated core stock sheet includes a core substrate layer and an intermediate filmic layer coupled to the core substrate layer. The intermediate filmic layer includes a conductive material that provides at least one of a security feature, a decorative feature, or other functional feature of the individual cards. The core substrate layer and the intermediate filmic layer are configured to be coupled with another laminated core stock sheet that may or may not include the intermediate filmic layer to form the composite laminate assembly configured for being separated into the individual cards. The conductive material has a small thickness within the intermediate filmic layer such that the intermediate filmic layer prevents conduction of electrostatic discharge (ESD) through the intermediate filmic layer and outside of the individual cards.

Optionally, the conductive material is formed from one or more of aluminum, zinc, gallium, indium, cadmium, copper, nickel, cobalt, iron, magnesium, platinum, tin, chromium, silver, rhodium, or palladium.

Optionally, the intermediate filmic layer extends over all or substantially all of a planar surface area of the core substrate layer.

Optionally, the intermediate filmic layer has one or more of a reflective mirror surface or a holographic effect.

Optionally, the conductive material of the intermediate filmic layer is configured to permit electromagnetic waves that are wirelessly communicated with radio frequency identification (RFID) devices disposed inside the individual cards through the intermediate filmic layer.

Optionally, the intermediate filmic layer is configured to not inhibit the electromagnetic waves having sub-gigahertz frequencies from passing through the intermediate filmic layer.

Optionally, the conductive material of the intermediate filmic layer has an optical density of at least 0.25 but no greater than 4.0.

In one embodiment, a composite laminate assembly configured to be separated into plural individual cards is provided. The assembly includes a first laminated core stock sheet including a first core substrate layer and a first intermediate filmic layer coupled to the first core substrate layer. The first intermediate filmic layer includes a conductive material that provides at least one of a security feature, a decorative feature, or other functional feature of the individual cards. The assembly also includes a second laminated core stock sheet including at least a second core substrate layer, wherein the first laminated core stock sheet and the second laminated core stock sheet are configured to be laminated together, a first overlay layer configured to be coupled with the first laminated core stock sheet, and a second overlay layer configured to be coupled with the second laminated core stock sheet such that the first and second laminated core stock sheets are disposed between the first overlay layer and the second overlay layer. The conductive material of the first intermediate filmic layer has a sufficiently small thickness to prevent conduction of electrostatic discharge (ESD) through the first intermediate filmic layer and outside of the individual cards.

Optionally, the conductive material is formed from one or more of aluminum, zinc, gallium, indium, cadmium, copper, nickel, cobalt, iron, magnesium, platinum, tin, chromium, silver, rhodium, or palladium.

Optionally, the first intermediate filmic layer is buried beneath the first overlay layer.

Optionally, the first intermediate filmic layer is buried at least one mil beneath the first overlay layer.

Optionally, the first intermediate filmic layer extends between all or substantially all of planar surface areas of the first laminated core stock sheet and the first overlay layer.

Optionally, the first intermediate filmic layer has a reflective mirror surface.

Optionally, the assembly also includes a radio frequency identification (RFID) inlay layer disposed between the first laminated core stock sheet and the second laminated core stock sheet, the RFID inlay layer including one or more RFID devices.

Optionally, the conductive material of the first intermediate filmic layer permits electromagnetic waves communicated with the RFID device to wirelessly pass through the first intermediate filmic layer.

Optionally, the first intermediate filmic layer is configured to permit the electromagnetic waves having sub-gigahertz frequencies to pass through the first intermediate filmic layer.

Optionally, the conductive material of the first intermediate filmic layer has an optical density of at least 0.25 but no greater than 4.0.

Optionally, the second laminated core stock sheet also includes a second intermediate filmic layer coupled to the second core substrate layer, the second intermediate filmic layer including conductive material that also provides at least one of a security feature, a decorative feature, or other functional feature of the individual cards.

In one embodiment, a method includes depositing a conductive material onto a continuous filmic web, and coupling the filmic web with the conductive material to a core substrate layer to form a first laminated core stock sheet. The first laminated core stock sheet is configured to be coupled with a second laminated core stock sheet that may or may not include the intermediate filmic layer to form a composite laminate assembly configured for being separated into individual cards. The conductive material is deposited at a thickness that prevents conduction of electrostatic discharge (ESD) through the first intermediate filmic layer and outside of the individual cards through the filmic web.

Optionally, the conductive material is deposited at the thickness such that the conductive material has an optical density of at least 0.25 but no greater than 4.0.

In one embodiment, a card assembly includes plural laminated core stock sheets coupled with each other, where at least one of the laminated core stock sheets includes a core substrate layer and an intermediate filmic layer coupled to the core substrate layer. The intermediate filmic layer includes a conductive material that provides at least one of a security feature, a decorative feature, or other functional feature. The conductive material has a small thickness within the intermediate filmic layer such that the intermediate filmic layer prevents lateral conduction of electrostatic discharge (ESD) through the intermediate filmic layer and outside of the individual cards.

Optionally, the conductive material is formed from one or more of aluminum, zinc, gallium, indium, cadmium, copper, nickel, cobalt, iron, magnesium, platinum, tin, chromium, silver, rhodium, or palladium.

Optionally, the intermediate filmic layer extends over all or substantially all of a planar surface area of the core substrate layer.

Optionally, the intermediate filmic layer has one or more of a reflective mirror surface or a holographic effect.

Optionally, the assembly also includes a radio frequency identification (RFID) device coupled with at least one of the core stock sheets. The conductive material of the intermediate filmic layer is configured to permit electromagnetic waves that are wirelessly communicated with the RFID device to pass through the intermediate filmic layer.

Optionally, the intermediate filmic layer is configured to not inhibit the electromagnetic waves having sub-gigahertz frequencies from passing through the intermediate filmic layer.

Optionally, the conductive material of the intermediate filmic layer has an optical density of at least 0.25 but no greater than 4.0.

It is to be understood that the above description is intended to be illustrative, and not restrictive. For example, the above-described embodiments (and/or aspects thereof)

may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. For example, the recitation of a "mechanism for," "module for," "device for," "unit for," "component for," "element for," "member for," "apparatus for," "machine for," or "system for" is not to be interpreted as invoking 35 U.S.C. § 112(f), and any claim that recites one or more of these terms is not to be interpreted as a means-plus-function claim.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A laminated core stock sheet for use in a composite laminate assembly configured for being separated into plural individual cards, the laminated core stock sheet comprising:
   a core substrate layer; and
   an intermediate filmic layer coupled to the core substrate layer, the intermediate filmic layer including a conductive material that provides at least one of a security feature, a decorative feature, or other functional feature of the individual cards, wherein the core substrate layer and the intermediate filmic layer are configured to be coupled with another laminated core stock sheet that may or may not include the intermediate filmic layer to form the composite laminate assembly configured for being separated into the individual cards,
   wherein the conductive material has a small thickness within the intermediate filmic layer such that the intermediate filmic layer prevents conduction of electrostatic discharge (ESD) through the intermediate filmic layer and outside of the individual cards,
   wherein the conductive material forms a layer that extends across the intermediate filmic layer, the layer of the conductive material extending continuously such that the layer of the conductive material is essentially devoid of visibly spaced-apart bodies of the conductive material.

2. The laminated core stock sheet of claim 1, wherein the conductive material is formed from one or more of aluminum, zinc, gallium, indium, cadmium, copper, nickel, cobalt, iron, magnesium, platinum, tin, chromium, silver, rhodium, or palladium.

3. The laminated core stock sheet of claim 1, wherein the intermediate filmic layer extends over all or substantially all of a planar surface area of the core substrate layer.

4. The laminated core stock sheet of claim 1, wherein the intermediate filmic layer has one or more of a reflective mirror surface or a holographic effect.

5. The laminated core stock sheet of claim 1, wherein the conductive material of the intermediate filmic layer is configured to permit electromagnetic waves that are wirelessly communicated with radio frequency identification (RFID) devices disposed inside the individual cards through the intermediate filmic layer.

6. The laminated core stock sheet of claim 5, wherein the intermediate filmic layer is configured to not inhibit the electromagnetic waves having sub-gigahertz frequencies from passing through the intermediate filmic layer.

7. The laminated core stock sheet of claim 1, wherein the conductive material of the intermediate filmic layer has an optical density of at least 0.25 but no greater than 4.0.

8. A composite laminate assembly configured to be separated into plural individual cards, the assembly comprising:
   a first laminated core stock sheet including a first core substrate layer and a first intermediate filmic layer coupled to the first core substrate layer, the first intermediate filmic layer including a conductive material that provides at least one of a security feature, a decorative feature, or other functional feature of the individual cards;
   a second laminated core stock sheet including at least a second core substrate layer, wherein the first laminated core stock sheet and the second laminated core stock sheet are configured to be laminated together;
   a first overlay layer configured to be coupled with the first laminated core stock sheet; and
   a second overlay layer configured to be coupled with the second laminated core stock sheet such that the first and second laminated core stock sheets are disposed between the first overlay layer and the second overlay layer,
   wherein the conductive material of the first intermediate filmic layer has a sufficiently small thickness to prevent conduction of electrostatic discharge (ESD) through the first intermediate filmic layer and outside of the individual cards,
   wherein the conductive material forms a layer that extends across the first intermediate filmic layer, the layer of the conductive material extending continuously such that the layer of the conductive material is devoid of visibly spaced-apart bodies of the conductive material.

9. The composite laminate assembly of claim 8, wherein the conductive material is formed from one or more of aluminum, zinc, gallium, indium, cadmium, copper, nickel, cobalt, iron, magnesium, platinum, tin, chromium, silver, rhodium, or palladium.

10. The composite laminate assembly of claim 8, wherein the first intermediate filmic layer is buried beneath the first overlay layer.

11. The composite laminate assembly of claim 8, wherein the first intermediate filmic layer extends between all or substantially all of planar surface areas of the first laminated core stock sheet and the first overlay layer.

12. The composite laminate assembly of claim 8, wherein the first intermediate filmic layer has a reflective mirror surface.

13. The composite laminate assembly of claim 8, further comprising a radio frequency identification (RFID) inlay layer disposed between the first laminated core stock sheet and the second laminated core stock sheet, the RFID inlay layer including one or more RFID devices.

14. The composite laminate assembly of claim 13, wherein the conductive material of the first intermediate filmic layer permits electromagnetic waves communicated with the RFID device to wirelessly pass through the first intermediate filmic layer.

15. The composite laminate assembly of claim 14, wherein the first intermediate filmic layer is configured to permit the electromagnetic waves having sub-gigahertz frequencies to pass through the first intermediate filmic layer.

16. The composite laminate assembly of claim 14, wherein the conductive material of the first intermediate filmic layer has an optical density of at least 0.25 but no greater than 4.0.

17. The composite laminate assembly of claim 8, wherein the second laminated core stock sheet also includes a second intermediate filmic layer coupled to the second core substrate layer, the second intermediate filmic layer including conductive material that also provides at least one of a security feature, a decorative feature, or other functional feature of the individual cards.

18. A method comprising:

depositing a conductive material onto a continuous filmic web; and coupling the filmic web with the conductive material to a core substrate layer to form a first laminated core stock sheet, wherein the first laminated core stock sheet is configured to be coupled with a second laminated core stock sheet that may or may not include the intermediate filmic layer to form a composite laminate assembly configured for being separated into individual cards, wherein the conductive material is deposited at a thickness that prevents conduction of electrostatic discharge (ESD) through the first intermediate filmic layer and outside of the individual cards through the filmic web, wherein the conductive material is deposited at the thickness such that the conductive material has an optical density of at least 0.25 but no greater than 4.0.

19. The laminated core stock sheet of claim 1, wherein the conductive material constitutes a thin layer.

20. The laminated core stock sheet of claim 19, wherein the conductive material is configured to enable conduction of ESD through the intermediate filmic layer, if not for the small thickness.

* * * * *